United States Patent
Borlinghaus

(10) Patent No.: US 7,075,716 B2
(45) Date of Patent: Jul. 11, 2006

(54) ARRANGEMENT FOR SPECTRALLY SENSITIVE REFLECTED-LIGHT AND TRANSMITTED-LIGHT MICROSCOPY

(75) Inventor: Rolf Borlinghaus, Dielheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 10/137,835

(22) Filed: May 3, 2002

(65) Prior Publication Data

US 2002/0176162 A1 Nov. 28, 2002

Related U.S. Application Data

(63) Continuation of application No. 09/758,673, filed on Jan. 11, 2001, now abandoned.

(30) Foreign Application Priority Data

Jul. 17, 2000 (DE) .............................. 200 12 378

(51) Int. Cl.
*G02B 21/06* (2006.01)

(52) U.S. Cl. ..................... 359/385; 359/368

(58) Field of Classification Search ................ 359/385, 359/212–214, 234, 235, 368; 356/444
See application file for complete search history.

(56) References Cited

U.S. PATENT DOCUMENTS

| 4,551,023 | A | * | 11/1985 | Nakauchi ................... 356/444 |
| 5,304,810 | A | | 4/1994 | Amos ..................... 250/458.1 |
| 5,321,501 | A | | 6/1994 | Swanson et al. ............ 356/345 |
| 5,793,049 | A | * | 8/1998 | Ballard .................... 250/458.1 |
| 5,886,784 | A | * | 3/1999 | Engelhardt ................. 356/326 |
| 6,028,306 | A | | 2/2000 | Hayashi .................... 250/235 |
| 6,167,173 | A | * | 12/2000 | Schoeppe et al. ............. 385/33 |
| 6,594,074 | B1 | * | 7/2003 | Wolleschensky et al. ... 359/385 |

FOREIGN PATENT DOCUMENTS

| DE | 43 30 447 A1 | 3/1995 |
| DE | 199 02 625 A1 | 9/1999 |
| DE | 198 35 070 | 2/2000 |
| GB | 2 344 014 A | 5/2000 |

* cited by examiner

*Primary Examiner*—Drew A. Dunn
*Assistant Examiner*—Lee Fineman
(74) *Attorney, Agent, or Firm*—Simpson & Simpson, PLLC

(57) ABSTRACT

The arrangement for spectrally sensitive reflected-light and transmitted-light microscopy comprises an illuminating device which illuminates a sample under study in two dimensions. A scanning device is provided which respectively directs the light emanating from a detection region of the sample under study onto a multiband detector. In one embodiment, the illuminating device is arranged in such a way that it transilluminates the sample in two dimensions. In a further embodiment, the illuminating device illuminates the sample in two dimensions in reflected light.

15 Claims, 5 Drawing Sheets

ARRANGEMENT FOR SPECTRALLY SENSITIVE REFLECTED-LIGHT AND TRANSMITTED-LIGHT MICROSCOPY

CROSS REFERENCE TO RELATED APPLICATIONS

This continuation patent application under 35 U.S.C. 120 claims the benefit of U.S. application Ser. No. 09/758,673, filed Jan. 11, 2001, now abandoned which is incorporated by reference herein. This application also claims the benefit of German filed utility model application DE 200 12 378.5 filed Jul. 17, 2000.

FIELD OF THE INVENTION

The invention relates to an arrangement for spectrally sensitive reflected-light and transmitted-light microscopy of a plurality of spectral regions of the reflected light or transmitted light of a sample, in particular for detecting the light coming from a scanning device in the detection beam path of a microscope.

BACKGROUND OF THE INVENTION

Devices for simultaneous detection of a plurality of spectral regions have been known from practice for a considerable time, specifically under the designation of "multiband detector." These are complicated optical arrangements which permit multiple focusing with the aid of additional optical systems. Such arrangements require a very considerable space for spectral multiband detection, and therefore entail a not inconsiderable overall size. Moreover, a defocusing effect regularly occurs there, thus entailing the need for permanent refocusing with the aid of the additional optical system—referred to the respective spectral region. These devices are principally used in confocal scanning microscopy (see in this regard: DE 199 02 625.4 and DE 43 30 447).

Color filters which permit detection of a plurality of wavelengths are likewise used in the prior art, DE 198 35 070, for analyzing the light emanating from the sample. In this case, the sample is illuminated with the aid of a laser via a scanning device using reflected light.

It is not possible using the prior art described above in conjunction with two-dimensional illumination to take sample data from a sample under study using reflected light or transmitted light in arbitrary spectral regions, in particular not simultaneously in a plurality of spectral regions.

SUMMARY OF THE INVENTION

It is therefore the object of the invention to create an arrangement in which the problems known from the prior art are avoided.

The above object is achieved by an arrangement for spectrally sensitive reflected-light and transmitted-light spectroscopy. The arrangement comprises an illuminating device for illuminating at least one region of a sample in two dimensions, a scanning device which defines a detection region in the sample and a multiband detector which receives the light emanating from the detection region of the sample in temporal sequence wherein the light is directed by the scanning device.

It has been realized according to the invention that the simultaneous detection of a plurality of spectral regions of the detecting light (transmitted light emanating from the sample) is directly possible whenever the detecting light is firstly spectrally spread out, and the spread-out light is subsequently split out of the dispersion plane. The splitting of the spread-out light out of the dispersion plane is performed in the way according to the invention by means of a special optical arrangement, the light split into spectral regions, or the spectral regions themselves being detected, specifically simultaneously. It is important here that the actual splitting into spectral regions is preceded by spreading out the detecting light such that the splitting out from the dispersion plane can take place on the spread-out beam. In any case, there is no need here for multiple focusing with the aid of additional optics.

As already previously stated, two optical arrangements are provided according to the invention, specifically firstly for spectrally spreading out the detecting light, and secondly for splitting and subsequently detecting. It is possible to place upstream of the arrangement for spectrally spreading out the detecting light a pinhole onto which the incoming detecting light is focused, it being possible for the pinhole to be placed directly downstream of a scanning device.

From there, the divergent beam runs to the arrangement for spectrally spreading out the detecting light, this arrangement comprising focusing optics and dispersion means. The dispersion means can be designed as a prism with regard to a particularly simple design. In a way which is further advantageous, a focusing optical system, which can, in turn, comprise a lens arrangement, is arranged in each case upstream and downstream of the dispersion means or the prism.

The light impinging on the prism is focused by the focusing optical systems into the slit/detector arrangement, which is still to be explained later, from where the splitting into spectral regions takes place.

Particularly with regard to the small overall size, reflection means for folding back the spread-out light are arranged downstream of the arrangement for spreading out the detecting light, it being possible for the reflection means to be a silvered surface or a mirror. In any case, the folding back of the spread-out light, which is performed at least once, permits the overall size of the device as a whole to be small.

As already previously mentioned, the detecting light can be focused into the slit/detector arrangement by means of the focusing optics. This slit/detector arrangement is therefore arranged in the beam path of the spread-out light and comprises reflecting surfaces which form slit diaphragms which decompose the spread-out light into a plurality of light beams and thus into spectral regions, doing so, on the one hand, by forming a slit and, on the other hand, by reflection out of the dispersion plane. In other words, the slit diaphragms serve the purpose of partially passing the light arriving there—in accordance with the diaphragm width— and, on the other hand, of reflecting at the reflecting surfaces provided there, with the result that even given only one slit diaphragm and two reflecting surfaces (on both sides one reflecting surface each for the purpose of forming the slit diaphragm) decomposition into three light beams and thus into three spectral regions is possible. This splitting is performed out of the dispersion plane of the spread-out light. Of course, both the light beam passed at the slit diaphragm and the reflected partial beam can impinge once again on a slit diaphragm and be decomposed there further in accordance with the foregoing explanation. The decomposition into a plurality of partial beams is therefore possible through multiple arrangements of slit diaphragms with appropriate reflecting surfaces.

The split light beams pass directly to detectors, the number of the detectors corresponding to the number of the light beams.

Moreover, it is essential for the slit diaphragms provided here that they are placed or arranged approximately at the focus of the spread-out light. The reflecting surfaces of the slit diaphragms are designed as silvered surfaces or mirrors, it being possible for the silvered surfaces to be vapor deposited, for example, in accordance with the substrate material.

With regard to a concrete configuration of the slit diaphragms, it is advantageous when the silvered surface is assigned to a slit diaphragm jaw which forms the slit diaphragm, and when the slit diaphragm jaw can be set or adjusted or displaced in its position which defines the slit diaphragm, the region of the spread-out light which is to be reflected and, if appropriate, the reflecting angle. Thus, by setting the slit diaphragm jaw it is possible to fix not only the spectral region of the light beam passed and the reflected light beam, but also the direction in which the reflected light beams run. The arrangement of the detectors is therefore variable, at least in a certain region.

In concrete terms, the slit diaphragm jaws could each be designed as a cubic rod with at least a partially silvered surface. One of the surfaces then serves, at least partially, as reflecting surface, being in this case the surface bordering on the actual slit. A solid glass body comes into consideration for producing the slit diaphragm jaw, and is already capable of offering total reflection at its surface depending on the type of glass used. Moreover, glass can be worked easily and has an extremely small coefficient of thermal expansion, with the result that there is no need to adjust the arrangement as a function of temperature.

In a further advantageous way, the slit diaphragm jaws are designed as a slide with a rotatably driven spindle and with an appropriate thread. To this extent, the setting of the slit diaphragm jaws could be performed via actuators which feed and, if appropriate, rotate the silvered surface of the slit diaphragm jaw. The slit width and the width of the reflected light, and thus the respective spectral region can be set by adjusting the position of the slit diaphragm jaw. Adjustment to permanently positioned detectors is possible by adjusting the angular position of the slit diaphragm jaw, and thus of the reflecting angle. The actuators can be any desired manual operations. Electric motors, in particular electric motors with micro-drive, can advantageously serve as actuators.

Measures for suppressing stray light can be provided within the slit/detector arrangement; thus, for example, so-called light traps or stops such as are adequately known from the prior art for the purpose of suppressing stray light.

Any conventional detectors can be used as detectors for the different spectral regions or colors. Thus, for example, it is also possible to use commercially available CCD sensors.

With regard to a compact design of the overall arrangement, it is advantageous when the device for spectrally spreading out the detecting light, and the slit/detector arrangement are supported by a single chassis which can be mounted or fixed directly on the scanning device. The slit/detector arrangement with the slit diaphragm jaws provided there could be arranged in a housing which can be handled as an insert. The insert could, in turn, be adjustable in position for the purpose of setting the angle of incidence and the dispersion plane of the spread-out light.

Finally, it is also conceivable for the housing for the slit/detector arrangement to be largely thermally insulated in order, specifically, effectively to avoid thermal influences on the arrangement there.

According to the invention, instead of the arrangement described, it is also possible to use as multiband detector an arrangement of dichroic beam splitters which are preferably fitted in a cascaded fashion.

There are various possibilities for advantageously configuring the teaching of the present invention and developing it further. For this purpose, reference may be made, on the one hand, to the claims dependent on Patent claim 1 and, on the other hand, to the following explanation of an exemplary embodiment of the invention with the aid of the drawing. Generally preferred refinements and improvements of the teaching are also explained in conjunction with the explanation of the preferred exemplary embodiment of the invention.

BRIEF DESCRIPTION OF THE DRAWINGS

The subject-matter of the invention is illustrated diagrammatically in the drawing and is described below with the aid of the figures, in which.

DETAILED DESCRIPTION OF THE PREFERRED EMBODIMENT

Figure 1:
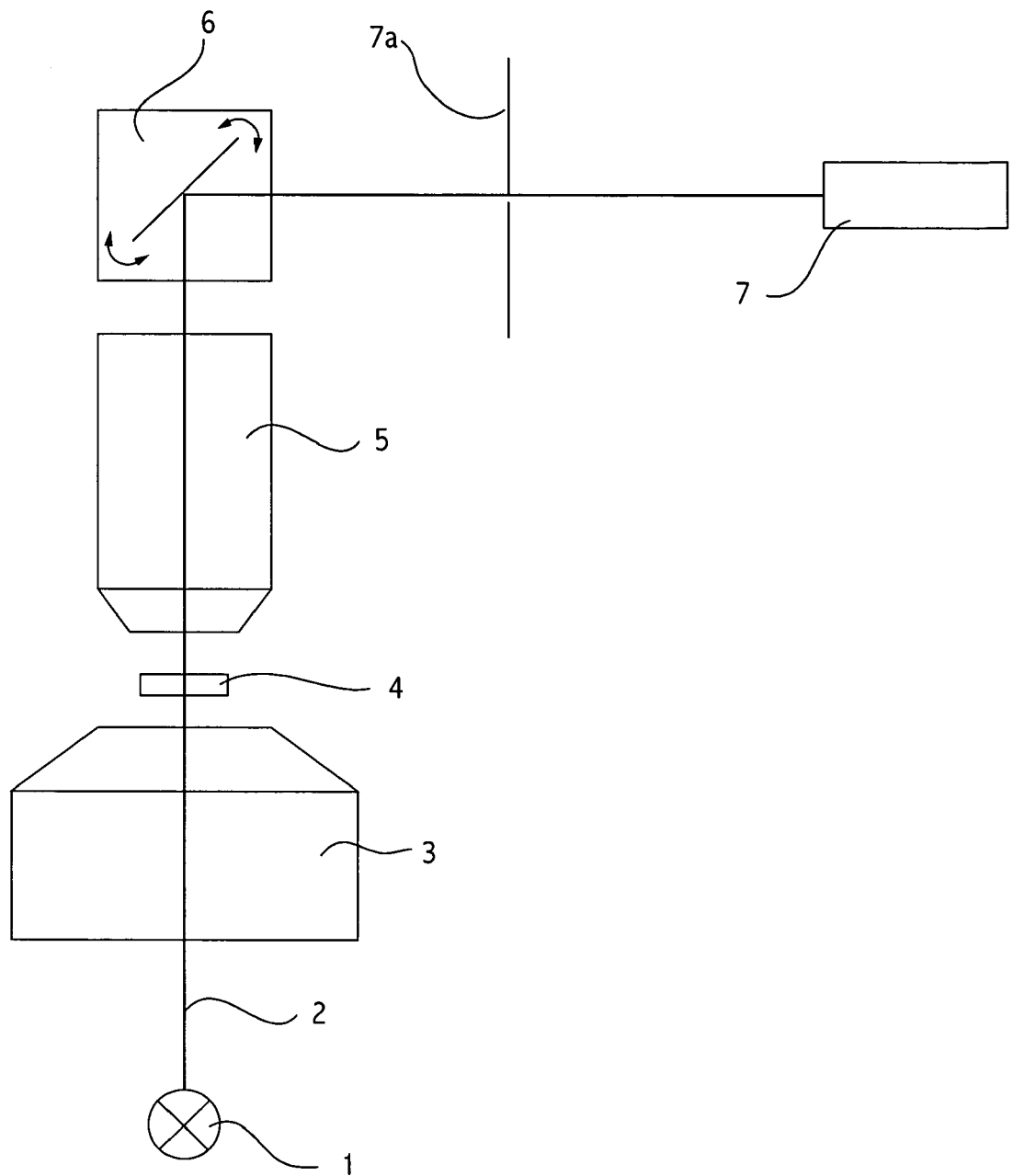
FIG. 1 shows a diagrammatic illustration of an embodiment of the invention for transmitted light.

FIG. 1 shows an embodiment of the invention for transmitted light. An illuminating source 1 generates a broadband beam which propagates essentially along an optical axis 2. A condenser 3 shapes the beam for illuminating a region of a sample 4 with transmitted light. The transmitted light passes through the objective 5 onto a scanning device 6. The scanning device 6 leads the light to a multiband detector 7. Placed upstream of the multiband detector 7 is a pinhole 7a which thereby directs the light from a detection region of the sample 4, which is smaller than the diameter of the pinhole 7a, onto the multiband detector 7. The design of the multiband detector 7 is explained more precisely in the following description.

Figure 2:
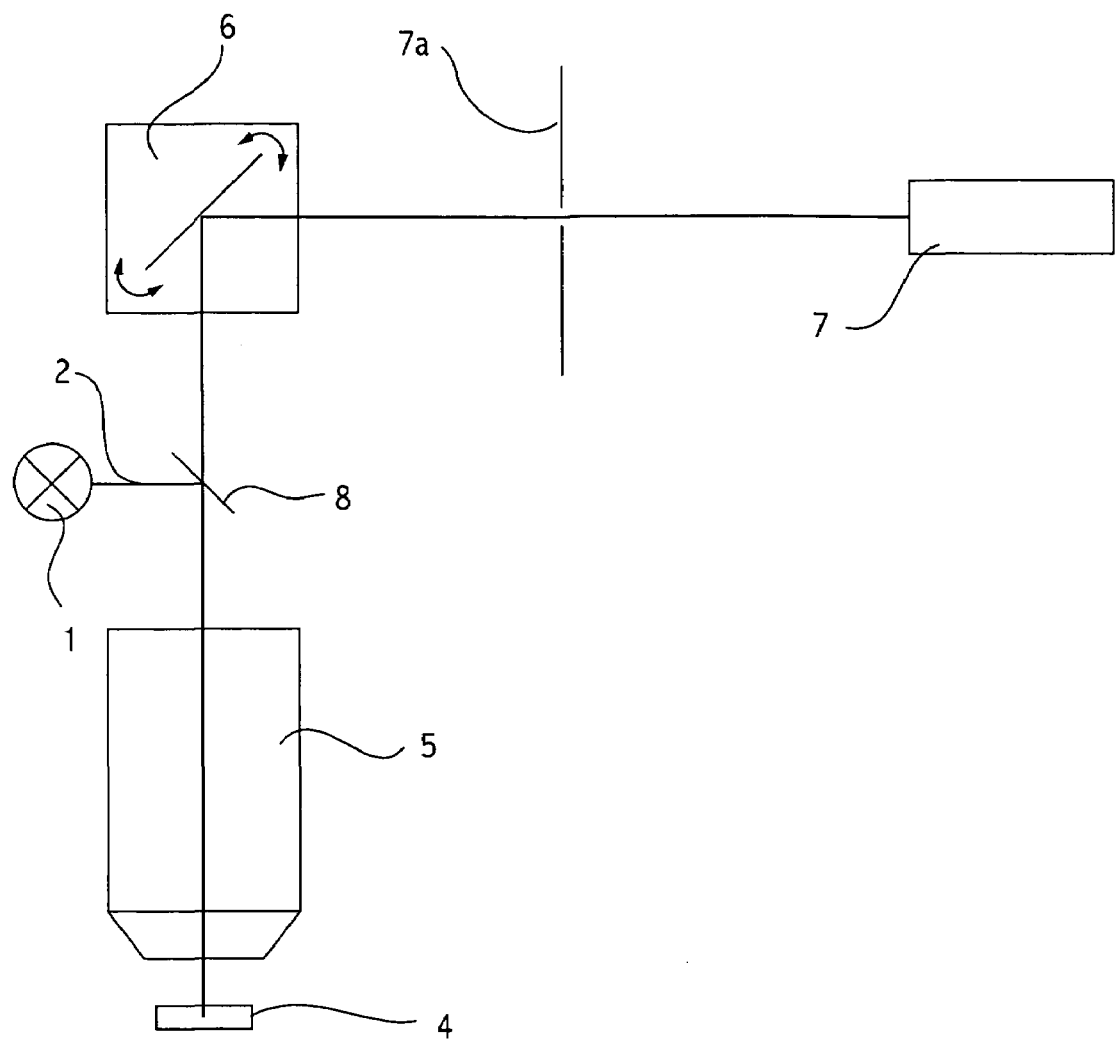
FIG. 2 shows a diagrammatic illustration of an embodiment of the invention for reflected light.

The exemplary embodiment illustrated in FIG. 2 discloses an arrangement for reflected-light illumination. In this case, the elements similar to those in FIG. 1 are denoted by the same reference numerals. An illuminating source 1 generates a broadband beam which propagates essentially along an optical axis 2. The beam is injected into the beam path of a microscope via a beam splitter 8. The reflected light passes to the sample 4 via the objective 5. The detecting light passes back via the objective 5 to the beam splitter 8, passes the latter, and impinges on a scanning device 6. The detecting light passes from the scanning device 6 to the multiband detector 7 via the pinhole 7a.

Figure 3:
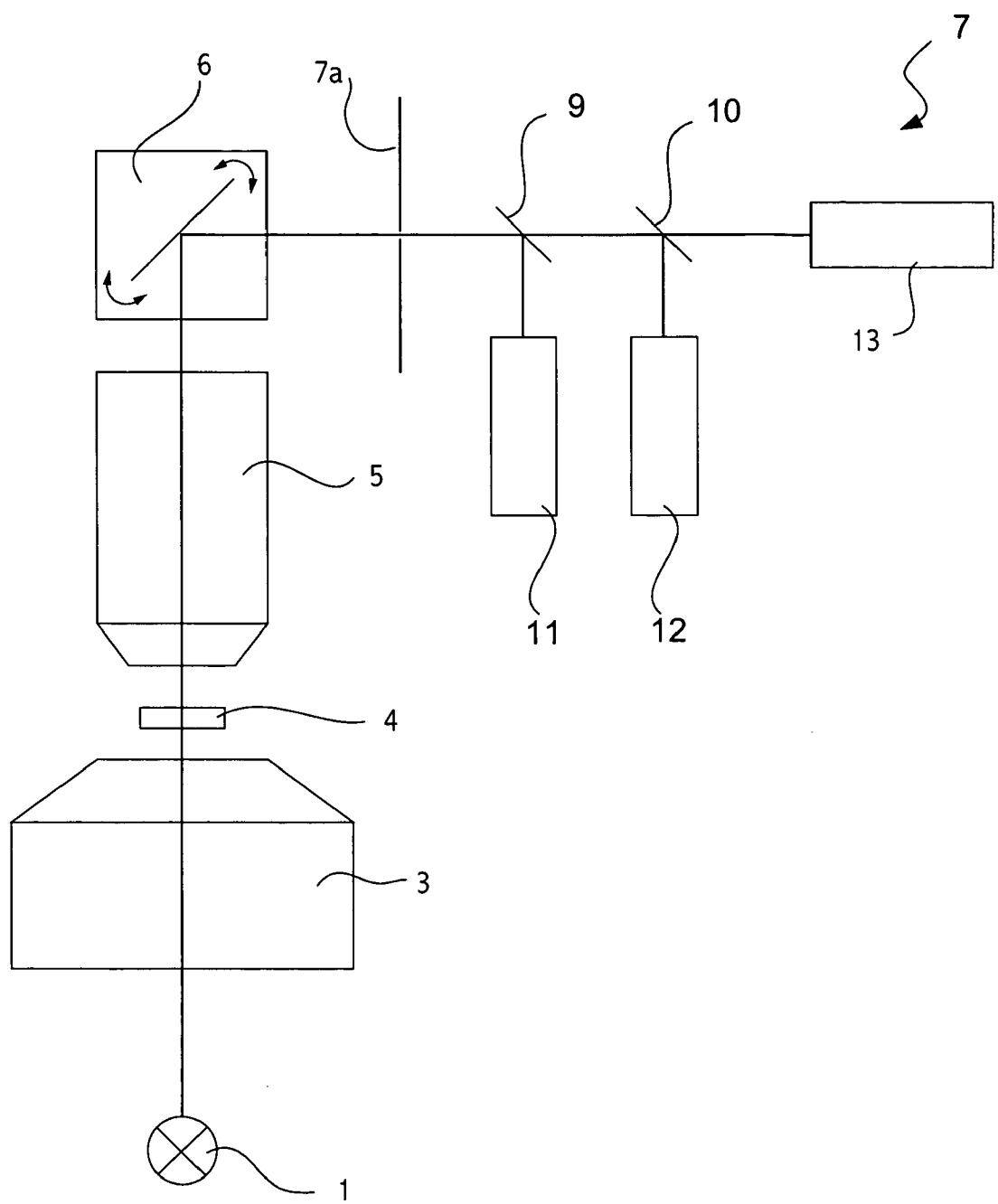
FIG. 3 shows a diagrammatic illustration of an embodiment of the invention for transmitted light with the use of dichroites.

A further embodiment of the invention is illustrated in FIG. 3. In this case, the elements similar to those in FIG. 1 are denoted by the same reference numerals. The embodiment likewise describes a transmitted-light arrangement. Downstream of the scanning device 6, the detecting light passes through the pinhole 7a to a multiband detector 7 which, in this embodiment, comprises at least one dichroite 9 or 10, and therefore distributes the detecting light to detectors 11 to 13 in a spectrally selective fashion.

Figure 4:
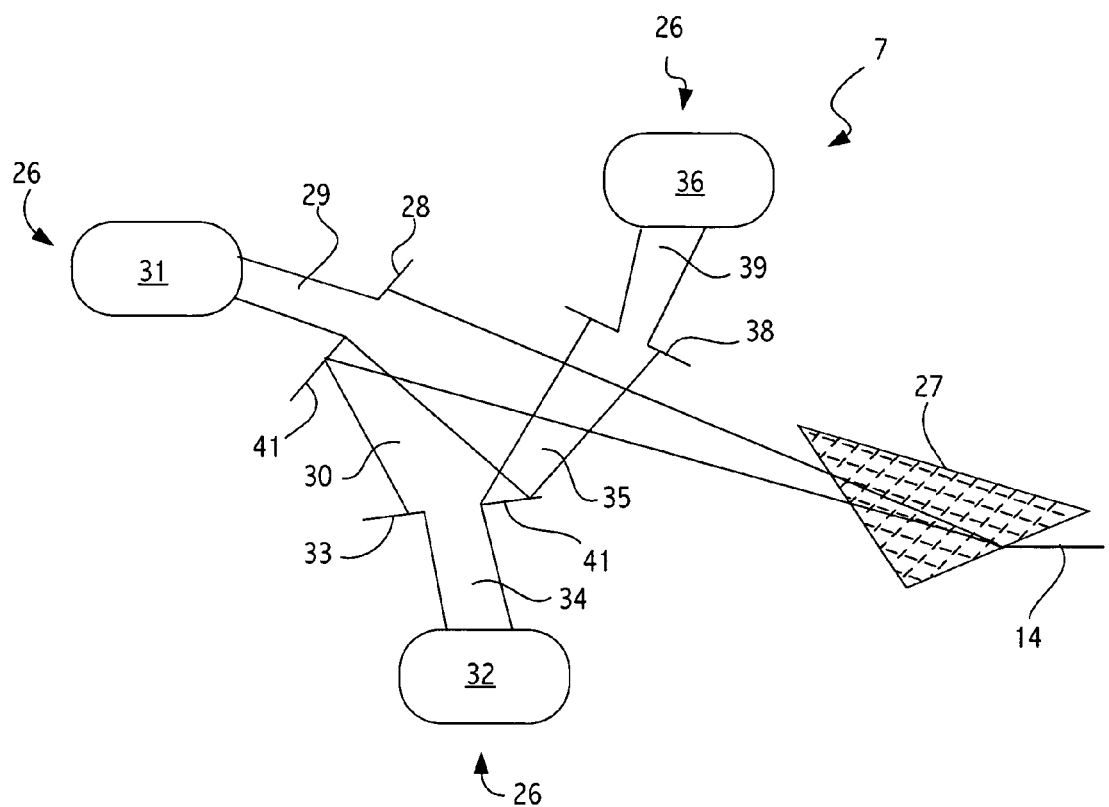
FIG. 4 shows a diagrammatic illustration of the principle of the mode of operation of the slit/detector arrangement.

A detailed view of the multiband detector 7, which is arranged, for example, in the beam path of the detecting light in FIG. 1, is illustrated diagrammatically in FIG. 4. The multiband detector 7 comprises means 33 for blocking out a second spectral region 34, on the one hand, and for further reflection of at least a portion 30 or 35 of the spectral region not blocked out here, on the other hand. The second detector 32 is arranged in the beam path of the blocked second spectral region 34, and a third detector 36 is arranged in the beam path of the spectral region 35 which is further reflected.

The multiband detector 7 also comprises means 38, arranged in the beam path of the spectral region 35 further reflected, for blocking out a third spectral region 39, the third detector 36 being arranged in the beam path of the blocked third spectral region 39. Consequently, a total of three spectral regions 29, 34, and 39 are selected and detected with the exemplary embodiment illustrated here. In accordance with the discussion in the general description, it is possible to cascade a plurality of means, which block out and reflect a plurality of spectral regions, and detectors 26, with the result that it is also possible straight away to select and detect even more than three spectral regions at the same time.

The means 27 for spectral decomposition of the light beam 14 are designed as a prism in the case of the exemplary embodiment illustrated in FIG. 4. The means 28, 33, and 38 are respectively designed as a slit diaphragm, a reflecting coating 41 being provided in each case for the purpose of reflecting at least a portion of the non-blocked spectral region on a surface facing the incident light.

Figure 5:
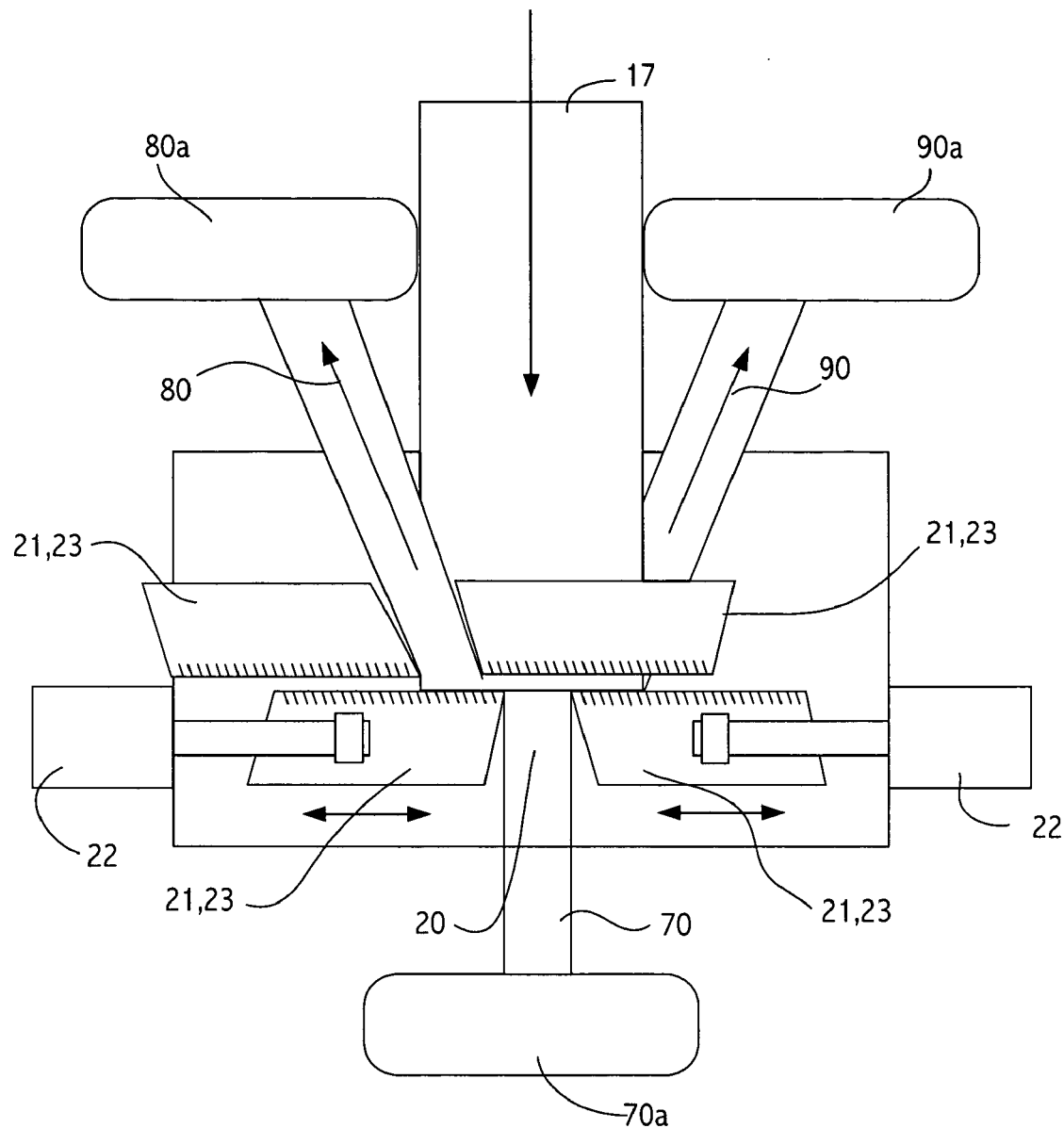
FIG. 5 shows a diagrammatic illustration of a possible arrangement of the components of the slit/detector arrangement.

FIG. 5 shows the principle of the mode of operation and, on the other hand, the basic arrangement of the respective components within the slit/detector arrangement or the multiband detector 7.

In the slit/detector arrangement 7, the spread-out beam 17 is led through the slit diaphragms 20 and the silvered surfaces 21 into a plurality of partial beams or spectral regions 70, 80, 90 and out of the dispersion plane 6 to the detectors 70a, 80a, 90a.

Both the detectors 70a, 80a, 90a, and the actuators 22, designed as electric motors, are shown only diagrammatically in the illustration in FIG. 5. The same holds for the slit diaphragm jaws 23, which form the slit diaphragms 20, together with the silvered surfaces 21, which are provided directly on the slit diaphragm jaws 23.

FIG. 5 shows clearly that portions of the spectrally spread-out beam 17 running into the slit/detector arrangement 7 are deflected upwards and downwards to the detectors 90a, 80a. A further partial beam or spectral region 70 passes the slit diaphragm 20 and reaches the detector 70a.

The actuators 22 permit the slit 20 to be set between the slit diaphragm jaws 23, it being possible to set individually the spectral regions 70, 80, 90 whose partial beams finally pass to the detectors 70a, 80a, 90a.

The splitting of the incident spread-out beam 17 renders it possible to place the split diaphragms 20 with sufficient accuracy in the focus of the spread-out beam 17.

It may be noted, finally, that only two of the total of four actuators 22 are illustrated in FIG. 5, for the sake of simplifying the illustration.

The arrangement according to the invention renders it possible to analyze the detecting light coming from the sample 4 spectrally. In this case, the slit opening 20 in the spreading-out plane is traversed linearly and thereby delivers a spectral intensity distribution of the light currently striking the multiband detector 7 from the scanning device 6.

Using the invention, it is possible with the aid of a simple illuminating source, which is a conventional halogen lamp, for example, to generate at various wavelengths images of a sample under study. In other words, it is possible to record a series of spectral images of a sample under study which can extend over the entire visible spectrum. In addition, the multiband detector 7 can be used to record simultaneously a plurality of images in different spectral sections of the overall spectrum.

It is explained below how images in different spectral regions are recorded sequentially. Use is made for this purpose of the arrangement with transmitted-light illumination, and the multiband detector 7 is designed as a slit/detector arrangement (see FIG. 5). The sample 4 is transilluminated with the aid of the illuminating device 1. The illumination of the sample 4 is selected in this case in such a way that it illuminates in two dimensions at least in the region of the sample which is recorded by the objective 5. The scanning device 6 arranged downstream of the objective 5 directs the light emanating from the sample onto the multiband detector 7. The scanning device 6 in this case rasterizes the sample or a selected region thereof in a punctiform fashion, with the result that information on the entire sample region under study passes to the multiband detector 7 in temporal sequence. Punctiform does not mean that only points of the sample 4 are rasterized. Rather, punctiform means that very small detection regions are scanned one after another. The size of the detection regions is determined, for example, in accordance with the inlet port of the multiband detector 7 or, in the case of a pinhole 7a, in accordance with the diameter thereof.

As already mentioned above, at least two images in a different spectral position can be recorded in parallel using the multiband detector 7. Furthermore, the multiband detector 7 can be set, for example, so as to record sequentially images which differ in color. The multiband detector 7 can be set in such a way that the entire spectrum is traversed. Spectrally spread-out images of the sample are obtained as a result, and thus so is information as to which points of the sample are emitting, passing or reflecting light of a specific position in the spectrum.

The invention has been described with reference to a particular embodiment. It goes without saying, however, that changes and modifications can be carried out without leaving the scope of protection of the following claims in the process.

| PARTS LIST | |
|---|---|
| 1 | Illuminating source |
| 2 | Optical axis |
| 3 | Condenser |
| 4 | Sample |
| 5 | Objective |
| 6 | Scanning device |
| 7 | Multiband detector |
| 7a | Pinhole |
| 8 | Beam splitter |
| 9 | Dichroite |
| 10 | Dichroite |
| 11 | Detector |
| 12 | Detector |

-continued

PARTS LIST

| | |
|---|---|
| 13 | Detector |
| 14 | Light beam |
| 17 | Spread-out beam |
| 20 | Slit opening |
| 21 | Silvered surfaces |
| 22 | Actuators |
| 23 | Slit diaphragm jaws |
| 26 | Detectors |
| 27 | Means for spectral decomposition |
| 28 | Blocking means |
| 29 | Spectral region |
| 30 | Reflected spectral region |
| 31 | First detector |
| 32 | Second detector |
| 33 | Blocking means |
| 34 | Second spectral region |
| 35 | Reflected spectral region |
| 36 | Third detector |
| 38 | Blocking means |
| 39 | Third spectral region |
| 41 | Reflecting coating |
| 70 | Spectral region |
| 70a | Detector |
| 80 | Spectral region |
| 80a | Detector |
| 90 | Spectral region |
| 90a | Detector |

What is claimed is:

1. A microscope including an arrangement for spectrally sensitive reflected-light and transmitted-light spectroscopy, said microscope comprising:
a broadband illuminating device for simultaneously illuminating an entire region of interest of a sample to create an entire illuminated region of interest;
an objective lens and an aperture, said objective lens and said aperture arranged upstream of a multiband detector;
a scanning device operatively arranged to scan a sub-region of said entire illuminated region of interest, said scanning device receiving and directing broadband light emanating from said sub-region of said entire illuminated region of interest to a said multiband detector.

2. The microscope according to claim 1, characterized in that the illuminating device transilluminates the sample in two dimensions.

3. The microscope according to claim 2, characterized in that the multiband detector records at least two data records of the sample of different spectral compositions.

4. The microscope according to claim 3, characterized in that the multiband detector comprises a slit/detector arrangement.

5. The microscope according to claim 3, characterized in that the multiband detector is formed by at least one dichroic beam splitter which directs the light onto an assigned detector in accordance with filter properties.

6. The microscope according to claim 1, characterized in that the illuminating device illuminates the sample in two dimensions in reflected light.

7. The microscope according to claim 1 wherein said scanning device defines a detection region, said detection region comprising a sub-region of said entire illuminated area of interest, said microscope further characterized in that said aperture is a pinhole, and said detection region is smaller than said pinhole.

8. The microscope according to claim 1, characterized in that the scanning device rasterizes the sample in such a way that the light from a plurality of sub-regions, which are substantially smaller than the entire illuminated region of interest of the sample, passes into the multiband detector sequentially.

9. The microscope according to claim 1 wherein said scanning device is operatively arranged to sequentially scan a plurality of sub-regions of said entire illuminated region of interest.

10. Arrangement for spectrally sensitive reflected-light and transmitted-light spectroscopy comprising:
a broadband illuminating device for simultaneously illuminating an entire region of interest of a sample to create an entire simultaneously illuminated region of interest;
an objective lens and an aperture disposed upstream of a multiband detector;
a scanning device operatively arranged to scan a sub-region of said entire simultaneously illuminated region of interest, said scanning device receiving and directing broadband light emanating from said sub-region of said entire simultaneously illuminated region of interest to said multiband detector.

11. The arrangement of claim 10 wherein said scanning device is adapted to sequentially scan sub-regions of said entire simultaneously illuminated region of interest.

12. The arrangement of claim 11 wherein said scanning device is not adapted to simultaneously scan said entire simultaneously illuminated region of interest.

13. A microscope for spectrally sensitive reflected-light and transmitted-light microscopy comprising:
a broadband illuminating device for simultaneously illuminating an entire region of interest of a sample to create an entire illuminated region of interest;
an objective lens for forming a focal plane at said sample to obtain an image, said objective lens receiving light emanating said sample corresponding to said image;
a scanning device receiving light emanating from said objective lens;
an aperture; and,
a multiband detector,
said objective lens arranged between said sample and said scanning device, said scanning device and said aperture arranged upstream of said multiband detector, said scanning device receiving and directing broadband light emanating from a sub-region of said entire illuminated region of interest to said multiband detector.

14. The microscope of claim 13 wherein said aperture is a pinhole.

15. The microscope of claim 13 wherein said scanning device is configured to sequentially scan a plurality of sub-regions of said entire illuminated region of interest.

* * * * *